United States Patent Office 3,342,765
Patented Sept. 19, 1967

3,342,765
POLYVINYL ESTER EMULSIONS CONTAINING ALPHA-BRANCHED, SATURATED, ALIPHATIC MONOCARBOXYLIC ACID SALTS
Hendricus A. Oosterhof and Klaas Ruyter, Amsterdam, Netherlands, assignors to Shell Oil Company, New York, N.Y., a corporation of Delaware
No Drawing. Filed Apr. 14, 1964, Ser. No. 359,795
Claims priority, application Netherlands, Apr. 16, 1963, 291,578
6 Claims. (Cl. 260—23)

The invention relates to a process for the preparation of aqueous latices. More particularly, the invention relates to the preparation of paint latices having depressed film-forming temperatures.

Specifically, the invention provides a process for preparing stable polyvinyl ester emulsions which comprises adding to said polyvinyl ester emulsion a monovalent cation salt of an aliphatic monocarboxylic acid.

It is well known that polymer films, particularly polyvinyl ester films, formed by evaporating a layer consisting of an aqueous emulsion of the polymers may have very different properties, depending on the circumstances obtained during evaporation. The temperature, in particular, plays a predominant role. If evaporation takes place below a specific temperature—the so-called minimum film-forming temperature (M.F.T.)—the resulting films, instead of being transparent and homogeneous, will be milky, cracked and swollen; at the same time adhesion will be poor and film strength slight, so that the films are unserviceable for industrial purposes.

It has now been found quite unexpectedly that when salts of aliphatic monocarboxylic acids in which a monovalent cation is attached to the acid radical are added to polyvinyl ester emulsions, the minimum film-forming temperature of said emulsion is not only substantially reduced but the resulting polymer films are transparent, homogeneous, strong and smooth as well as exhibiting excellent adhesion to various substrates.

It is therefore the primary object of the present invention to provide a process for the preparation of aqueous emulsions of polyvinyl esters which have depressed minimum film-forming temperatures with resulting improved properties such as strength, transparency and smoothness. Other objects will become apparent to one skilled in the art from the following discussion and disclosure.

These and other objects are particularly accomplished by the process for the preparation of polymer compositions in the form of aqueous emulsions, which compositions are suitable for the application of surface coats and which compositions, apart from water, consist substantially of one or more polyvinyl ester polymers, said compositions containing one or more monovalent cation salts of an aliphatic monocarboxylic acid, preferably from about 0.1% to 20% by weight of the polymer of a water soluble monovalent cation salt of an aliphatic monocarboxylic acid containing from about 2 to 22 carbon atoms in the molecule.

Although, in general, any salts of aliphatic monocarboxylic acids in which a monovalent cation is attached to the acid radical can be utilized according to the invention, the water soluble salts are preferred with the sodium, potassium and ammonium salts most preferred.

For the sake of brevity the salts of aliphatic monocarboxylic acids in which a monovalent cation is attached to the acid radical will sometimes be hereinafter referred to as monocarboxylates.

The invention is generally applicable to all polymer emulsions employed in applying surface coatings to objects. Preferred, however, are polymer or copolymer emulsions based on one or more of the following: vinyl acetate; vinyl propionate; vinyl caprate; vinyl chloride; acrylic esters, such as methyl acrylate, ethyl acrylate, butyl acrylate, and 2-ethylhexyl acrylate; methacrylic esters such as methyl methacrylate, ethyl methacrylate and butyl methacrylate; maleic esters; styrene; butadiene and acrylonitrile. Forming an important group among these emulsions are those obtained by emulsion polymerization of vinyl esters of saturated aliphatic monocarboxylic acids. The minimum film-forming temperature of these polymer emulsions is, in many cases, 10–15° C., whereas application of the present invention may bring it down to around 5° C. or lower.

According to the invention, good results are especially yielded by the use of polyvinyl ester emulsions prepared by emulsion polymerization of vinyl esters of saturated monocarboxylic acids, at least some of whose carboxyl groups are attached to tertiary and/or quaternary carbon atoms. The preparation of such polyvinyl ester latices or emulsions under certain favorable conditions forms the subject of the copending U.S. application Ser. No. 251,767, filed Jan. 16, 1963.

The amount of monovalent cation salt of the aliphatic monocarboxylic acid (monocarboxylate) needed for the required effect may, in general, vary from 0.1 to 20%, based on the amount of solid polymer taken for processing. But higher or lower percentages may also be employed.

As there is a relationship between the amount of monocarboxylate added and the minimum film-forming temperature, these quantities will have to be adjusted to each other, if optimum results are to be achieved. The values of these quantities may vary from one case to another. Besides the type of monocarboxylate applied, the nature and composition of the polymer emulsion used play a part. Frequently, an amount of monocarboxylate between 1 and 10% is sufficient to reduce the minimum film-forming temperature of the polymer emulsion to 0–5° C.

Although, in general, carboxylates of any monocarboxylic acid can be employed according to the invention, in practice the salts of carboxylic acids that are used for the present process will not contain more than 22 carbon atoms to the molecule. Carboxylates that have been derived from aliphatic monocarboxylic acids with more than 22 carbon atoms to the molecule are not excluded, however.

The aliphatic monocarboxylic acids from which the carboxylates according to the invention are derived, may be saturated or unsaturated. They may be branched or unbranched and substituents may also occur in the chain of the molecule.

Examples of saturated aliphatic monocarboxylic acids include the normal fatty acids, such as acetic acid, propionic acid, butyric acid, caproic acid, caprylic acid, capric acid and lauric acid.

Examples of unsaturated aliphatic monocarboxylic acids include acrylic acid, crotonic acid, 3-methylcrotonic acid, dehydrated castor oil fatty acids, oleic acid, linoleic acid and linolenic acid.

Two or more carboxylates derived from saturated and/or unsaturated aliphatic monocarboxylic acids may, if desired, be used together.

Excellent results are obtained if carboxylates are used that have been derived from saturated monocarboxylic acids in which the carboxyl groups are attached to tertiary and/or quaternary carbon atoms.

Suitable such alpha-branched saturated monocarboxylic acids may be represented by the general formula:

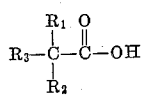

wherein $R_1$ and $R_2$ each represent the same or different alkyl radicals of normal, branched or cyclic structure and $R_3$ represents hydrogen or a hydrocarbyl radical. In the foregoing formula, $R_1$ and $R_2$ each may be a methyl, ethyl, propyl, butyl, pentyl, octyl, decyl, etc. radical. Hydrocarbyl radicals represented by $R_3$ comprise, for example, alkyl radicals of normal, branched or cyclic structure, including methyl, ethyl, propyl, butyl, pentyl, hexyl, octyl, as well as alkaryl, aralkyl and aryl radicals. Very suitable such monocarboxylic acids include the alpha,alpha-dialkyl monocarboxylic acids having from 9 to about 22 carbon atoms in the molecule. A preferred group comprises the acids possessing from about 9 to 19 carbon atoms with those acids having from 9 to 11 and 15–19 carbon atoms being especially preferred. A suitable method for their production is disclosed in U.S. 3,047,662, U.S. 3,059,005 and U.S. 3,059,006.

As saturated aliphatic monocarboxylic acids in which the carboxyl group is attached to a tertiary or quaternary carbon atom, those monocarboxylic acids may well be used which are obtained by reacting formic acid or carbon monoxide and water, with olefins, or with paraffins in the presence of hydrogen acceptors such as olefins or compounds, such as alcohols and alkyl halides, from which olefins can be obtained by splitting off water or hydrogen halide, respectively, under the influence of liquid acid catalysts such as sulfuric acid, phosphoric acid or complex compositions of phosphoric acid, boron trifluoride and water. These saturated aliphatic monocarboxylic acids branched at the alpha position and prepared in this manner are usually called Koch acids in the art ("Carbonsaure-Synthese aus Olefinen, Kohlenoxyd Und Wasser," Koch, Brennstoff-Chemie, November 1955, pages 321–328). Monocarboxylic acids branched at the alpha position can also be obtained according to Reppe's method. Of special value are the acids from monoolefins with 8 to 18 carbon atoms. Mixtures of olefins obtained by cracking paraffinic hydrocarbons, such as petroleum fractions, are preferably used at starting material. These mixtures may contain both branched and unbranched acyclic olefins as well as cycloaliphatic olefins. By the action of formic acid or of carbon monoxide and water, a mixture of saturated acyclic and cycloaliphatic monocarboxylic acids is obtained therefrom.

For brevity the saturated aliphtic monocarboxylic acids in which the carboxyl groups are attached to tertiary and/or quaternary carbon atoms will be herein referred to as alpha-branched or branched monocarboxylic acids.

By the the above-mentioned methods mixtures of branched monocarboxylic acids are often obtained; such mixtures consist largely of acids in which the carboxyl group is attached to a quaternary carbon atom. Furthermore, suitable monocarboxylic acids branched at the alpha position may be obtained by Reppe's method.

Although it is preferable to make use of the above-described mixtures of monocarboxylic acids branched at the alpha position which have, for example, nine to eleven or fifteen to nineteen carbon atoms to the molecule, other monocarboxylic acids branched at the alpha position—or mixtures thereof—are also very suitable.

The invention is illustrated by some examples. The parts mentioned therein are parts by weight. The monocarboxylic acids branched at the alpha position have been obtained by the reaction of olefins containing 8–10 carbon atoms to the molecule, with carbon monoxide and water in the presence of a catalyst consisting of phosphoric acid, boron trifluoride and water. They contain 9–11 carbon atoms to the molecule and the carboxyl group is attached to a tertiary or quaternary carbon atom.

EXAMPLE I

The base material was a polymer emulsion prepared by polymerization of the following components:

| | Parts |
|---|---|
| Vinyl acetate | 51 |
| Vinyl esters of branched monocarboxylic acids ($C_8$–$C_{11}$) | 48 |
| Acrylic acid | 1 |

The content of dry matter of the polymer emulsion was 50%, the minimum film-forming temperature 12° C.

Ammonium salts of branched monocarboxylic acids with 9–11 carbon atoms to the molecule were added in the form of a 15% solution in water to a polymer emulsion in quantities of 2 and 5% based on the solid polymer, respectively.

After the ammonium salts had been added to the polymer emulsions and the mixtures left for 24 hours, these were cooled down to 5° C. and applied to a glass plate cooled to 5° C., with the aid of 125μ Doctor blade. Film forming took place at 5° C. At the end of five hours the film forming was evaluated.

By the addition both of 2% and of 5% of ammonium salts of branched monocarboxylic acids having 9–11 carbon atoms to the molecule, a film was formed that was perfectly transparent, strong and smooth and which adhered well to the carrier.

Control

The polymer emulsion had the same composition as that described in Example I.

The experiment was carried out in a manner substantially analogous to that described in Example I, but without the addition of the carboxylate.

When dry, the resultant film had a milky, swollen appearance, it flaked off the substrate easily and its strength was very poor.

EXAMPLE II

A commercial polymer emulsion was used, of which the polymer was composed of:

| | Parts |
|---|---|
| Vinyl acetate | 85 |
| Vinyl caprate | 15 |

The content of dry matter of the polymer emulsion was 56%, the minimum film-forming temperature was 10° C.

Ammonium salts of branched monocarboxylic acids having 9–11 carbon atoms to the molecule were added as a 15% solution in water to a polymer emulsion in the amounts listed below, based on the amounts of solid polymer. The minimum film-forming temperatures (MFT) obtained are:

With a quantity of 2% an MFT of 5° C.
With a quantity of 4% an MFT of 2° C.
With a quantity of 6% an MFT of 0° C.

EXAMPLE III

A commercial polymer emulsion was used which contained a copolymer of vinyl acetate and 2-ethyl hexyl acrylate. The amount of 2-ethyl hexyl acrylate incorporated therein was equivalent in plasticizing effect to 10% of dibutyl phthalate.

The content of dry matter of the polymer emulsion was 55%, the minimum film-forming temperature 9° C.

Ammonium salts of branched monocarboxylic acids having 9–11 carbon atoms to the molecule were added as a 15% solution in water to the polymer emulsion in the amounts listed below, based on the amount of solid polymer. The minimum film-forming temperatures obtained are:

With a quantity of 2% an MFT of 5–6° C.
With a quantity of 4% an MFT of 2–3° C.
With a quantity of 6% an MFT of 0° C.

EXAMPLE IV

Related results are obtained when the sodium and/or potassium salts of alpha-branched saturated aliphatic monocarboxylic acids having 9–11 and 15–19 carbon atoms in the molecule are employed.

We claim as our invention:

1. A process for preparing polymer films from polyvinyl ester emulsions having depressed film-forming temperatures which comprises (1) polymerizing at least one vinyl ester in an aqueous emulsion system, (2) adding from 0.1% to 20% of a monovalent cation salt of mixed alpha-branched, saturated, aliphatic monocarboxylic acids containing from 9 to 22 carbon atoms in the molecule based on the weight of polymer to said aqueous emulsion, said monocarboxylic acids being prepared by reacting monoolefins with carbon monoxide and water in the presence of liquid acidic catalysts, (3) applying the polyvinyl ester emulsion to a surface and (4) allowing the water to evaporate to cure the film.

2. A process as in claim 1 wherein the alpha-branched saturated, aliphatic monocarboxylic acids have the general formula:

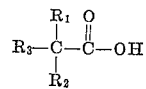

wherein $R_1$ and $R_2$ are alkyl radicals, $R_3$ is selected from the group consisting of alkyl radicals and hydrogen, and $R_1$, $R_2$ and $R_3$ contain a total of from 7 to 20 carbon atoms.

3. A process as in claim 1 wherein the water soluble monovalent cation salt is an ammonium salt of an alpha-branched saturated aliphatic monocarboxylic acid containing from 9–11 carbon atoms in the molecule.

4. A process as in claim 1 wherein the water soluble monovalent cation salt is an ammonium salt of an alpha-branched saturated aliphatic monocarboxylic acid containing from 15–19 carbon atoms in the molecule.

5. A process as in claim 1 wherein the water soluble monovalent cation salt is employed in amounts from 2% to 10% by weight.

6. A process as in claim 1 wherein the polymer is substantially a copolymer of vinyl acetate and vinyl esters of alpha-branched saturated aliphatic monocarboxylic acids containing from 9–11 carbon atoms.

References Cited

UNITED STATES PATENTS

| | | | |
|---|---|---|---|
| 2,567,678 | 9/1951 | Morrison | 260—27 |
| 2,595,954 | 5/1952 | Kunze et al. | 260—29.6 |
| 2,948,638 | 8/1960 | Baird et al. | 260—29.6 |
| 3,287,300 | 11/1966 | Oosterhof et al. | 260—23 |

FOREIGN PATENTS 664,980  6/1963  Canada.

MURRAY TILLMAN, *Primary Examiner.*

W. J. BRIGGS, *Assistant Examiner.*